United States Patent
Tzivanopoulos et al.

(10) Patent No.: US 11,628,785 B2
(45) Date of Patent: Apr. 18, 2023

(54) METHOD FOR PROVIDING A RETREAT SPACE FOR THE PERIODIC RECUPERATION OF A PERSON, VEHICLE FOR USE IN THE METHOD, AND PORTABLE DEVICE FOR USE IN THE METHOD

(71) Applicant: Volkswagen Aktiengesellschaft, Wolfsburg (DE)

(72) Inventors: Theodoros Tzivanopoulos, Wolfsburg (DE); Frank Minter, Lehre (DE); Marcel Kaltenberg, Titz-Rödingen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 785 days.

(21) Appl. No.: 16/662,401

(22) Filed: Oct. 24, 2019

(65) Prior Publication Data
US 2020/0130616 A1 Apr. 30, 2020

(30) Foreign Application Priority Data
Oct. 25, 2018 (DE) ...................... 10 2018 218 256.6

(51) Int. Cl.
*B60R 16/037* (2006.01)
*B60K 35/00* (2006.01)
(Continued)

(52) U.S. Cl.
CPC ....... *B60R 16/037* (2013.01); *B60H 1/00735* (2013.01); *B60K 35/00* (2013.01);
(Continued)

(58) Field of Classification Search
CPC .. B60R 16/037; B60H 1/00735; B60K 35/00; B60K 2370/152; B60K 2370/52;
(Continued)

(56) References Cited

U.S. PATENT DOCUMENTS

| | | | |
|---|---|---|---|
| 5,104,037 A * | 4/1992 | Karg ...................... | B61D 27/00 236/51 |
| 5,129,376 A * | 7/1992 | Parmley .............. | F02N 11/0807 307/10.6 |

(Continued)

FOREIGN PATENT DOCUMENTS

| | | | | |
|---|---|---|---|---|
| DE | 102009060213 B4 | 6/2012 | ............ | B60W 40/00 |
| DE | 102013222421 A1 | 5/2014 | ............ | G06Q 10/00 |

(Continued)

OTHER PUBLICATIONS

Rent a Limo, URL: https://web.archive.org/web/20180904043933/ https://www.rent-a-limo.net/, 12 pages (German w/ English translation), Sep. 4, 2018.

(Continued)

*Primary Examiner* — Richard M Camby
(74) *Attorney, Agent, or Firm* — Slayden Grubert Beard PLLC

(57) ABSTRACT

The present disclosure relates to a method for providing a retreat space for the periodic recuperation of a person. In this case, the interior of a vehicle serves as the retreat space. Said vehicle may be a person's own passenger vehicle or a rented vehicle. Since the retreat space is only used for brief recuperation, e.g., during a lunch break, the space is prepared such that it can fulfill the recuperation requirements from the very start. For this purpose, a request message is sent to the vehicle, by means of which request message the vehicle is prepared as a retreat space for the person. Said preparation consists in configuring the vehicle interior, at least in terms of lighting and/or climatic conditions and/or (Continued)

entertainment facilities, to serve as a retreat space for the recuperation of said person at the reserved time in accordance with the request message. The vehicle may also receive a reservation request message from a service provider who provides vehicles for rent.

19 Claims, 3 Drawing Sheets

(51) Int. Cl.
  *G05D 1/00* (2006.01)
  *B60H 1/00* (2006.01)
(52) U.S. Cl.
  CPC ...... *G05D 1/0088* (2013.01); *B60K 2370/152* (2019.05); *B60K 2370/52* (2019.05)
(58) Field of Classification Search
  CPC .............. B60K 2370/573; B60K 37/06; G05D 1/0088; B60Q 3/70; G06Q 10/02; G06Q 50/10
  See application file for complete search history.

(56) References Cited

U.S. PATENT DOCUMENTS

| | | | | |
|---|---|---|---|---|
| 5,168,170 | A * | 12/1992 | Hartig | H02J 3/14 307/34 |
| 5,617,732 | A * | 4/1997 | Albader | B60H 1/3208 180/53.4 |
| 5,917,405 | A * | 6/1999 | Joao | B60R 25/33 340/425.5 |
| 8,893,032 | B2 * | 11/2014 | Bruck | G06F 3/04842 715/771 |
| 2003/0016130 | A1 | 1/2003 | Joao | 340/539.1 |
| 2007/0112939 | A1 * | 5/2007 | Wilson | H04L 12/2807 709/219 |
| 2007/0192486 | A1 * | 8/2007 | Wilson | H04N 7/163 348/E7.071 |
| 2009/0195349 | A1 * | 8/2009 | Frader-Thompson | G01D 4/002 340/3.1 |
| 2010/0191487 | A1 * | 7/2010 | Rada | H02J 3/01 707/E17.014 |
| 2011/0251807 | A1 * | 10/2011 | Rada | G01D 4/00 702/61 |
| 2014/0129301 | A1 | 5/2014 | Van Wiemeersch et al. | 705/13 |
| 2015/0094896 | A1 | 4/2015 | Cuddihy et al. | 701/23 |
| 2015/0161835 | A1 * | 6/2015 | Jablokov | H04Q 9/00 340/5.61 |
| 2016/0001720 | A1 | 1/2016 | Vadgama et al. | 701/2 |
| 2016/0280234 | A1 | 9/2016 | Reilhac | 701/23 |
| 2017/0101032 | A1 | 4/2017 | Sugioka et al. | 701/48 |
| 2017/0267124 | A1 | 9/2017 | Numazawa et al. | |
| 2017/0309072 | A1 | 10/2017 | Li et al. | |
| 2017/0330044 | A1 | 11/2017 | Telpaz et al. | |

FOREIGN PATENT DOCUMENTS

| | | | |
|---|---|---|---|
| DE | 102015209603 A1 | 6/2016 | ............... A61B 5/18 |
| DE | 102016011857 A1 | 4/2017 | ............. G06Q 50/30 |
| EP | 2840000 A2 | 2/2015 | ............ B60W 10/04 |
| WO | 2016/120363 A3 | 9/2016 | ............. B60K 35/00 |
| WO | 2017/102614 A1 | 6/2017 | ............. B60K 28/06 |
| WO | 2017/137235 A3 | 3/2018 | ............... H04R 3/12 |

OTHER PUBLICATIONS

German Office Action, Application No. 102018218256.6, 6 pages, dated Sep. 13, 2019.

* cited by examiner

| ID | x | t | Δt | Λ | Obj. | AVS |
|---|---|---|---|---|---|---|

METHOD FOR PROVIDING A RETREAT SPACE FOR THE PERIODIC RECUPERATION OF A PERSON, VEHICLE FOR USE IN THE METHOD, AND PORTABLE DEVICE FOR USE IN THE METHOD

CROSS-REFERENCE TO RELATED APPLICATIONS

This application claims priority to German Patent Application No. 10 2018 218 256.6, filed on Oct. 25, 2018 with the German Patent and Trademark Office. The contents of the aforesaid Patent Application are incorporated herein for all purposes.

TECHNICAL FIELD

The present disclosure relates to the technical field of providing a place of retreat for the periodic recuperation of a person. A method is proposed by means of which the retreat space is provided. A vehicle is correspondingly modified and adapted for this purpose. With the advent of autonomous driving, there is even the possibility of renting the vehicle specifically for this purpose. The proposal further relates to a correspondingly designed vehicle and to a portable device by means of which the person can request the retreat space.

BACKGROUND

The modern working world is changing. Fixed working times with strictly regulated breaks are becoming more rare. Employees demand the greatest possible degree of flexibility. Even office spaces are being configured differently. To some extent, the trend is back toward open-plan offices. Many employees have the opportunity to work from home on one or more days. Others have to share a pool of spaces which are staffed flexibly from one day to the next. Furthermore, it has been recognized that well-rested employees are more productive. Therefore, employees are now able to take short recovery breaks if they need to. This applies for example to employees who work in offices, but it may also be permitted for employees who work in factories. The break spaces for factory employees are often overcrowded and recuperation in line with individual requirements is not possible.

SUMMARY

Overall, there is the need for improved recuperation options for employees of a company as well as for other people, such as self-employed individuals, students, private individuals, etc. The proposal is based on the idea of making available individual recuperation space. In this regard, a vehicle is proposed for use as the individual recuperation space.

Moreover, there is the need for improving the use of a vehicle as an individual recuperation space, not only during travel, but also for those seeking recuperation who cannot find a suitable space therefor. An object therefore exists to find such an approach.

This object is solved according to the subject matter of the independent claims by a method for providing a retreat space for the temporary recuperation of a person and by a vehicle for use in the method.

The dependent claims and the following description comprise embodiments of the invention in accordance with the following description of these measures.

DETAILED DESCRIPTION

Figure 1:
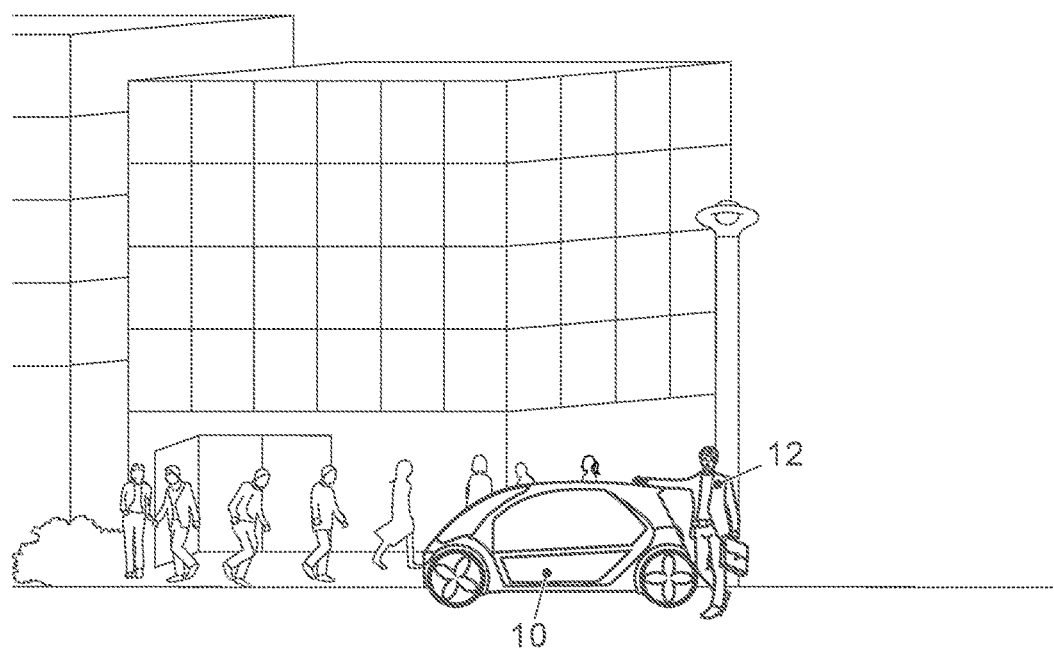
FIG. 1 shows an embodiment of a vehicle that is used as a retreat space for a person seeking recuperation.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

As already mentioned above, one idea is to temporarily provide a place of retreat for a person seeking recuperation.

In one aspect, a method is disclosed for providing a retreat space for the temporary recuperation of a person, a request message being sent to a vehicle, by means of which request message the vehicle is requested as a retreat space for the person, and the vehicle interior being configured, at least in terms of one or more of the group of lighting, climatic conditions, and entertainment facilities/settings, to serve as a retreat space for the recuperation of said person at the reserved time in accordance with the request message.

In some embodiments, a reservation message is sent to the vehicle by a service provider who previously received the request message from the person. In some embodiments and by means of the reservation message, one of the available vehicles in the fleet of the service provider is assigned to the requesting client and is configured in the same way as in the case of the request message that goes directly to the vehicle.

In the vehicle, the client may in some embodiments be immersed in a new world in which they can relax, assisted by music, climatic conditions, visual displays (e.g., via display screens, a projector that uses the headliner as a projection surface, etc.) and light. The person may adopt a relaxing sitting position and relax by means of massaging. In the process, their heart rate or their eye movements and/or skin resistance may be measured in some embodiments in order to visualize the success of the relaxation. This can be done, e.g., by on-board measuring instruments or, e.g., the personal portable device can be used for this purpose.

In some embodiments, the request message is transmitted to the vehicle via a transmission system based on mobile telecommunications or via another wireless communication system. The other wireless communication system may be a Wi-Fi (also referred to as 'WLAN' wireless local area network) telecommunication system.

The request message may for example expediently be sent out from a personal portable device of the person seeking recuperation. Such a portable device may be a smartphone, a tablet computer, a laptop, or notebook computer. The state of relaxation of the client may in some embodiments be tracked and evaluated by the portable device by means of vital parameters such as pulse and heart rate in order to signal to the client whether the desired relaxation could be achieved. There are corresponding accessories by means of which the devices can record corresponding data.

The person may use their own correspondingly equipped vehicle for recuperation in some embodiments. However, a correspondingly equipped vehicle may also be rented by a person on demand in order to relax in a targeted manner in some embodiments. The user may choose their own world of relaxation as a possible ambience for recuperation. In this case and in some embodiments, the request message contains information about a desired period of time and optionally a location where the vehicle is to be kept ready for the desired period of time. Information about an ambience to be set could also be contained in some embodiments. For example, images or videos from the user's last holiday could be played back. Similarly, the individual favorite music of the relevant person could be played back, for example. The vehicle thus becomes an oasis of relaxation.

The vehicle in some embodiments drives by itself (autonomously) to the agreed meeting point so that the person may get in and becomes immersed in a new world. In the process, the vehicle may be stationary at a particular location for the entire duration or even cover a particular route in corresponding embodiments. The vehicle doesn't need to be the property of the person, but rather may also simply be rented from a provider. Such providers may be commercial providers of rental vehicles or providers of car sharing services or mobility services.

In another aspect, a vehicle for use in the disclosed method may be equipped with one or more of the group of
- a lighting unit, by means of which the interior is lit correspondingly in accordance with the requested ambience;
- an electronic entertainment unit, by means of which corresponding images, videos and/or music can be played back in accordance with the ambience; and
- an air-conditioning unit, by means of which the vehicle interior is air-conditioned correspondingly in accordance with the requested ambience.

The vehicle may also and in some embodiments be equipped with an on-board connectivity unit. This allows for reception of messages via mobile telecommunications or another wireless communication system.

In this way, the above-described request message can be received. As a result, the vehicle may be individually prepared according to the needs of the client, e.g., by preconfiguring the interior climate with regard to temperature, scent and air humidity or air quality.

In some embodiments, the air-conditioning unit is equipped with a scent generator, by means of which a corresponding scent is generated in the vehicle interior in accordance with the requested ambience profile. This way, it is possible to appeal to the person's sense of smell for the purpose of recuperation.

In some embodiments, the electronic entertainment unit is equipped with a number of display devices on which the images and/or videos are played back in the vehicle interior in accordance with the requested ambience profile.

In some embodiments, the electronic entertainment unit may comprise an audio device, as is conventional, by means of which the desired music is played back in accordance with the requested ambience profile.

In some embodiments, the vehicle comprises an interface by means of which items ordered from outside manually by a delivery service or automatically by a robot/drone can be supplied to the vehicle. These items may be meals/drinks.

In some embodiments, the interface comprises a receptacle for keeping meals and/or drinks warm and/or cooling the same until the client gets into the vehicle. Said interface or an additional interface may then be used to remove garbage. A newspaper or magazine could for example also be supplied as an item.

Further embodiments of the invention are shown in the drawings and explained in greater detail in the following with reference to the FIGS.

The present description illustrates the principles of the disclosure. It should be understood that a person skilled in the art is able to conceive various arrangements which, although not explicitly described here, embody principles of the invention and are also considered as encompassed within the scope of this application.

FIG. 1 provides an overview of the concept according to an embodiment. The reference number 10 denotes a vehicle provided as a retreat space by a person 12 seeking recuperation. In the example shown, the vehicle 10 is in a public parking lot in front of the building where the person 12 seeking recuperation works or has made an appointment. A passenger vehicle is shown, but any other type of vehicle is conceivable as the vehicle 10. Examples of other vehicles include: buses, commercial vehicles, RVs, mobile homes, agricultural machines, construction machines, railway vehicles, etc. It is generally possible to use the present subject matter in land vehicles, railway vehicles, watercraft, and aircraft.

In a typical case, the person 12 is the owner of the vehicle. It would also be typical for the owner to have driven to work in the vehicle 10 and to have parked the vehicle in a reserved parking space at the employer's premises. The person 12 seeking recuperation could then also call on the vehicle 10 in the reserved parking space.

In another typical case, the person seeking recuperation is not the owner of the vehicle 10. The person 12 could have rented the vehicle 10 and driven the rental vehicle to the appointment.

In another case considered here, the person 12 seeking recuperation has only rented the vehicle 10 for the purpose of recuperation during a work break (e.g., lunch break). This case is considered in greater detail below.

Figure 2:
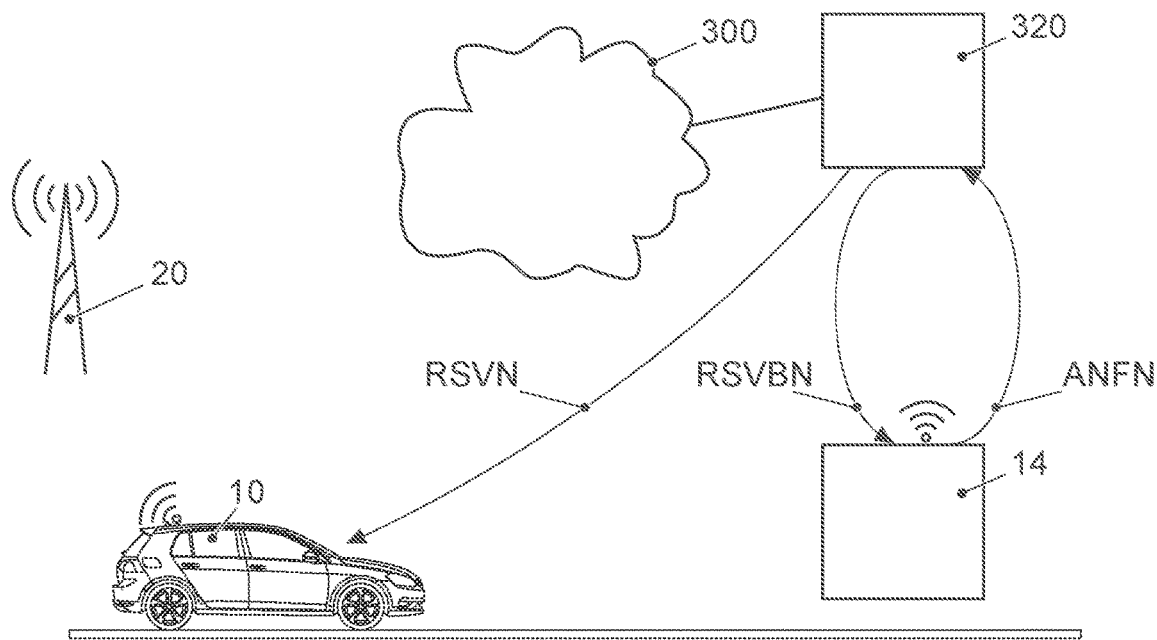
FIG. 2 shows the vehicle and a personal portable device by means of which the person seeking recuperation sends a request message to the vehicle or a service provider.

The person 12 seeking recuperation plans the use of the vehicle 10 as a place of retreat in advance. The planning takes place using a personal portable device of the person 10. FIG. 2 shows the vehicle 10 and the personal portable device 14 of the person 10. Typically, the personal portable device 14 is a smartphone or a smartwatch, a tablet computer, laptop computer or notebook computer. Devices of this kind are connected to the Internet 300 via mobile telecommunications or another wireless communication system, e.g., WLAN. In the example shown in FIG. 2, the device 14 is a smartphone and is connected to the Internet 300 via a mobile telecommunication system, e.g., LTE (Long-Term Evolution). The vehicle 10 is also equipped with a communication module that is also configured for mobile telecommunication. A mobile telecommunication base station 210 is shown separately. Said station operates a mobile telecommunication cell into which the vehicle 10 and the personal portable device 14 are logged when in spatial proximity. However, the vehicle 10 and the portable device 14 may also be logged into different mobile telecommunication cells. The message exchange between the personal portable device 14 and the vehicle 10 is also shown in FIG. 2.

In a first step, a request message ANFN is sent from the personal portable device 14 to a backend server 320 of a service provider. A rental vehicle provider, a car sharing provider or a general vehicle provider, for example, is conceivable as the service provider. The message is forwarded in the conventional manner initially to the base station 210 into which the portable device 14 is logged and from there via the Internet 300 to the backend server 320.

Figures 3, 4:
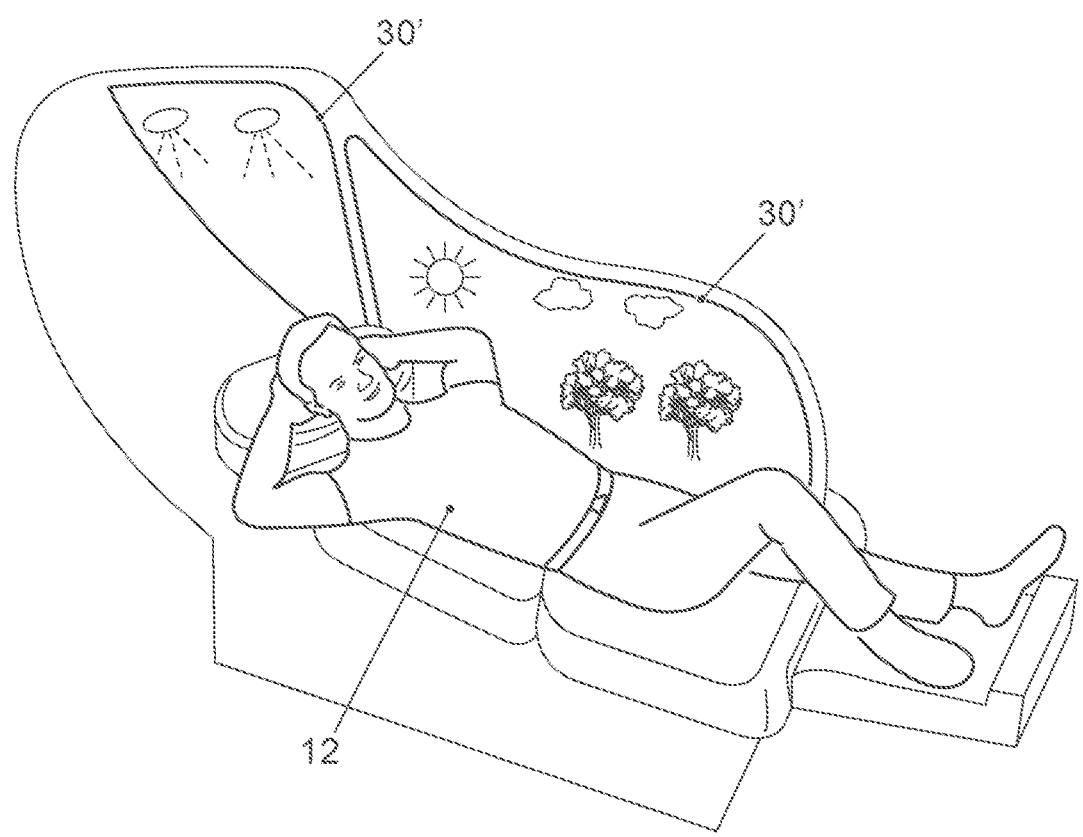
FIG. 3 shows the format of a request message.
FIG. 4 shows an example of a layout of the vehicle interior in which the person seeking recuperation is resting.

FIG. 3 shows an example of the format of the request message ANFN. A reservation request for a vehicle 10 that the person 12 seeking recuperation would like to rent as a place of retreat is included in said request message. The reservation request contains the following information:

The location x, chosen by the person seeking recuperation, where the vehicle 10 is to be left
The time t at which the vehicle is to be provided
The duration Δt for which the vehicle is to be rented
The ambience Λ to be set in the vehicle interior
The items G to be supplied with the vehicle
The media content (audio, video, images) AVS to be played back Typical items that can be supplied include a selection of meals and drinks or snacks.

The request message ANFN is evaluated by the backend server 320. Then, a reservation message RSVN is sent out to an available vehicle 10, which is informed that it is being rented out to the requesting person 12. The relevant information that was also already contained in the request message ANFN is transmitted to the vehicle 10.

After the vehicle 10 has been reserved, a confirmation message RSVBN is sent back to the requesting person 12 by the backend server 320. This confirmation message not only provides the person with the confirmation information, but also an authentication code by means of which the person 12 is supposed to authenticate themselves in order to gain access to the vehicle 10 at the desired time. The person 12 must send this authentication code to the backend server 320 in order to gain access to the vehicle 10 at the agreed location and at the agreed time. This can be done in the form of a text message or in the form of another message. The backend server 320 will unlock the vehicle 10 by means of another message as soon as it receives the valid authentication code from the authorized person at the desired time. Other forms of authentication are also possible, including input of a code on a numeric keypad of the vehicle 10, unlocking by means of reading in the fingerprint on a fingerprint scanner of the vehicle 10 or by means of an RFID chip, which the person receives in advance from the service provider.

In the vehicle 10, the person 12 can expect a pleasant and relaxing ambience entirely in accordance with their individual wishes, communicated by said person in the request message ANFN. In addition, the client can change the settings for light, climatic conditions, displays, etc., on-site in the vehicle.

FIG. 4 shows the vehicle interior of the vehicle 10. The interior has already been brought to a pleasant temperature. For this purpose, a corresponding air-conditioning system is provided which is programmed accordingly upon reservation. The window panes of the vehicle 10 can be darkened in order to suppress disruptive light effects coming from outside. In the interior, displays 30 on which images/videos corresponding to the desired ambience are shown are mounted on the window panes. Said displays may be OLED displays that may be manufactured so as to be extremely thin and that may even be stuck to the window panes. A seat that can be brought into a comfortable position for relaxing is located in the vehicle 10. Music that suits the selected ambience can be played back via the audio system in the vehicle 10. The relevant person's own favorite music could also be played. In addition, the person can expect to find the items (meals, drinks, etc.) ordered during reservation of the vehicle. These were delivered to the vehicle 10 beforehand. The service provider placed this order according to the client's wishes and will list the relevant line items in their invoice to the client. The delivery service commissioned must have access to the vehicle 10 in order to drop off the items. For this purpose, the vehicle 10 may be equipped with a special interface such that the delivery service can drop off the items without being able to open the vehicle door. The interface may be designed in the form of a flap or smaller door which can in turn be opened by means of conventional authentication systems, such as unlocking via smartphone, RFID chip, fingerprint scanner, key, etc. In addition, the interface may be equipped with a cooling zone and/or warming zone in order to keep meals or drinks warm or cold. Delivery may also be made automatically by corresponding drone or robot delivery systems.

Figure 5:
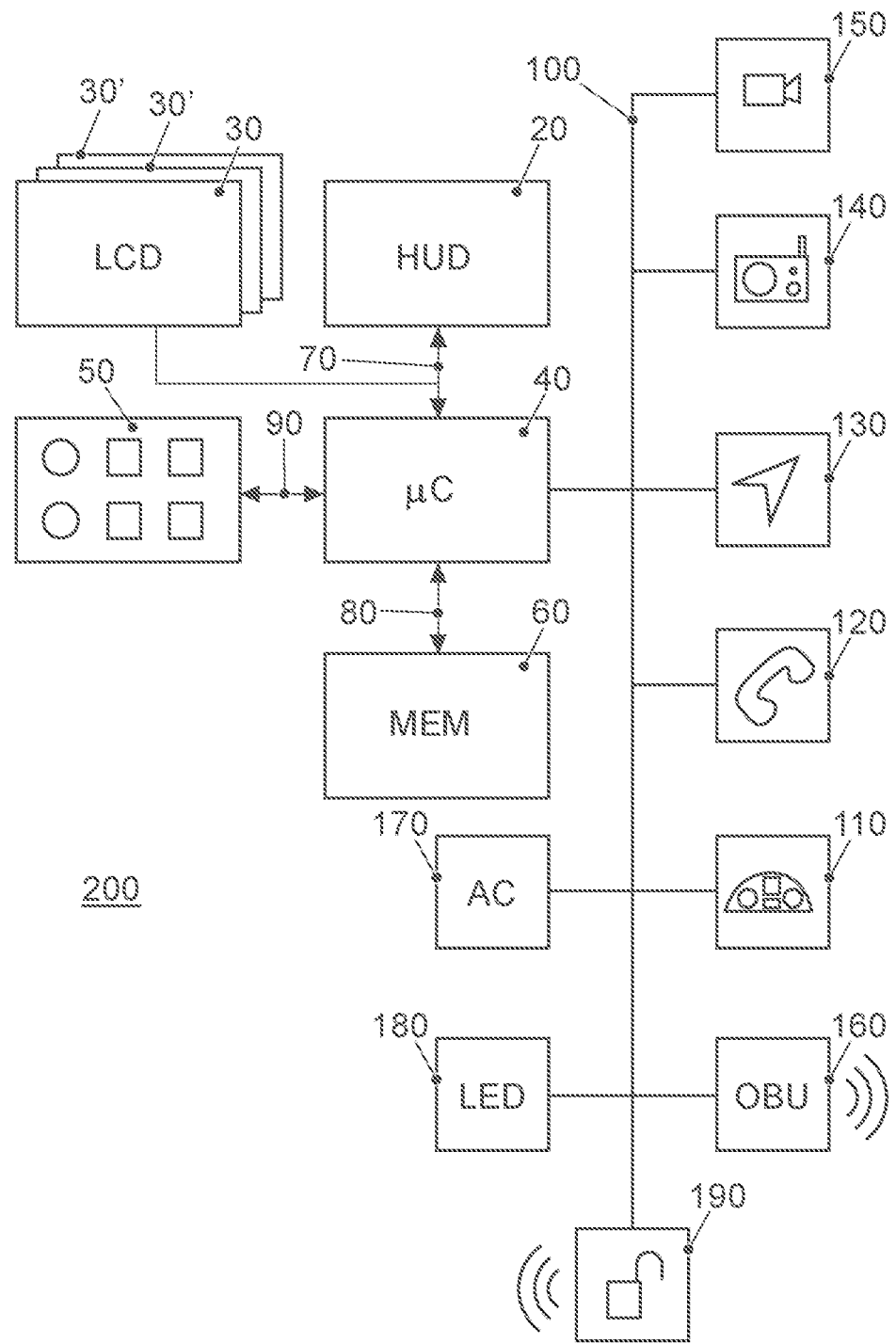
FIG. 5 is a block diagram of the extended infotainment system of the vehicle used as a retreat space for a person seeking recuperation.

FIG. 5 shows a block diagram of the modified infotainment system of the vehicle 10 according to an embodiment. In the case of motor vehicles, in particular passenger vehicles, an infotainment system refers to the combination of a car radio, navigation system, hands-free apparatus, driver assistance system and other functions in a central operating unit. The term "infotainment" is a portmanteau of the words "information" and "entertainment". A touch-sensitive screen 30 ("touchscreen") is primarily used for operating the infotainment system. In addition, mechanical operating elements, such as buttons, knobs or combinations thereof, such as push-and-turn knobs, may be arranged in an input unit 50 below the screen 30. Typically, it is also possible to operate parts of the infotainment system using the steering wheel. This unit is not shown separately, but rather is considered part of the input unit 50.

A computing apparatus 40 and a memory 60 are provided next to the input unit. The display unit 30 comprises a display surface for displaying changeable graphical information and also a user interface (touch-sensitive layer) arranged over the display surface for the input of commands by means of a user. Other display units 30' relate to the already mentioned OLED displays for displaying the ambience images and videos.

The display units 30 and 30' are connected to the computing apparatus 40 via a data line 70. The data line may be designed in accordance with the LVDS (low-voltage differential signaling) standard. The display unit 30 receives control data for controlling the display surface of the touchscreen 30 from the computing apparatus 40 via the data line 70. Control data relating to the input commands are also transmitted from the touchscreen 30 to the computing apparatus 40 via the data line 70. The OLED displays 30' receive the image data and video data via corresponding data lines 70.

The memory apparatus 60 is connected to the computing apparatus 40 via a data line 80. A pictogram directory and/or symbol directory comprising the pictograms and/or symbols for the possible superimposition of additional information on the head-up display HUD 20 is stored in the memory 60. The image, video and audio data of the ambience set is also saved in the memory 60.

The other parts of the infotainment system, camera 150, radio 140, navigation device 130, telephone 120 and instrument cluster 110, are connected via the data bus 100 to the device for operating the infotainment system. The high-speed variant of the CAN bus according to ISO standard 11898-2 is conceivable as the data bus 100. Alternatively, a bus system based on Ethernet technology, such as BroadR-Reach, may also be used, for example. Bus systems that use optical waveguides for the data transmission may also be used. The MOST (Media Oriented System Transport) bus or D2B bus (Domestic Digital Bus) are cited as examples of this. It should at this point be noted that the camera 150 may be designed as a conventional video camera. In this case, the camera records 25 full images per second, which corresponds to 50 half images per second in the interlaced recording mode. Alternatively, a special camera may be used which records more images per second in order to increase the accuracy of the object recognition for the monitoring of the surroundings in the case of objects that move faster. The vehicle 10 is equipped with a communication module 160 for inward and outward wireless communication. Said module is often also referred to as an on-board connectivity unit OCU. It may be configured for mobile telecommunication, e.g., according to the LTE (Long-Term Evolution) standard. Equally, it may be configured for WLAN (wireless local area network) communication, be it for communicating with devices of the vehicle occupants or for vehicle-to-vehicle communication, etc.

The other components in the block diagram are a programmable air-conditioning system 170, a programmable interior lighting unit 180 and an interface 190. The air-conditioning system 170 and the lighting unit are set in accordance with the desired ambience. Because it takes a certain amount of time before the vehicle interior is cooled or heated to the desired temperature, the setting procedure for the air-conditioning unit takes place in advance, i.e., before the person 12 steps into the vehicle 10 at the reserved time.

After the person 12 has left the vehicle 10, the delivery service can dispose of that left over from the delivery once again. This may also take place via the interface 190 or via a second interface provided for this purpose.

In another embodiment, the vehicle 10 does not have to remain at a fixed location during the reserved time. Since the vehicle 10 is equipped for autonomous driving, it can also cover a desired or arbitrary route and return to the point of departure or drive to another desired location at the end of the reserved time.

In another embodiment, the request message ANFN is sent directly to the vehicle 10. This is intended for the case in which the person who sends the request message ANFN is the owner of the vehicle 10. In this case, no service provider needs to make a reservation of the vehicle. By means of the request message, the vehicle 10 receives all the information needed to set the corresponding ambience at the planned time. The vehicle could additionally be equipped to order the desired items from a delivery service such that these are delivered as described above.

It should be understood that all examples mentioned herein and conditional phrases used herein are not restricted to such specifically cited examples. A person skilled in the art would therefore recognize, for example, that the block diagram shown here is a conceptual view of an exemplary circuit arrangement. Similarly, it should be acknowledged that any flow diagram, state transition diagram, pseudocode and the like shown are different variants for demonstrating processes which can substantially be stored in computer-readable media and which can therefore be executed by a computer or processor. The object mentioned in the patent claims may also expressly be a person.

It should be understood that the proposed method and the associated devices can be implemented in various forms of hardware, software, firmware, special processors or a combination thereof. Special processors may include application-specific integrated circuits (ASICs), reduced instruction set computers (RISCs) and/or field-programmable gate arrays (FPGAs). In some embodiments, the proposed method and the device are implemented as a combination of hardware and software. The software may in some embodiments be installed as an application program on a program memory device. Typically, said device is a machine based on a computer platform that comprises hardware, such as one or more central processing units (CPUs), a random-access memory (RAM) and one or more input/output (I/O) interfaces. Typically, an operating system is also installed on the computer platform. The various processes and functions described here may be part of the application program or a part executed by means of the operating system.

The disclosure is not limited to the above-described embodiments. There is scope for various adaptations and modifications that a person skilled in the art would consider based on their knowledge in the art and in connection with the present disclosure.

REFERENCE NUMBER LIST

10 Vehicle
12 Person seeking recuperation
14 Personal portable device
20 Head-up display HUD
30 Touch-sensitive display unit
30' OLED display
40 Computing unit
50 Input unit
60 Memory unit
70 Data line to display unit
80 Data line to memory unit
90 Data line to input unit
100 Data bus
110 Instrument cluster
120 Telephone
130 Navigation device
140 Radio
150 Camera
160 Communication module
170 Air-conditioning unit
180 Interior lighting unit
190 Interface for delivery of items
200 Infotainment system
ANFN Request message
RSVN Reservation message
RSVBN Reservation confirmation message The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for providing a retreat space for the temporary recuperation of a person in a vehicle, comprising:
sending a retreat space request message to the vehicle or a backend server of a service provider comprising a request for configuring the vehicle as a retreat space for the person, wherein the retreat space request message comprises at least a location for the vehicle, selected by the person seeking recuperation, the time at which the vehicle is to be provided, and the duration for which the vehicle is to be provided;
receiving the retreat space request message;
reserving the vehicle from a fleet of vehicles;
sending a confirmation message back to the person, comprising at least authentication information to gain access to the vehicle; and
configuring a vehicle interior of the vehicle according to the retreat space request message, which configuring sets at least one or more of lighting, climatic conditions, and entertainment facilities in the vehicle interior at a reserved time in accordance with the retreat space request message.

2. The method of claim 1, wherein the retreat space request message is transmitted to the vehicle or the backend server via a transmission system based on mobile telecommunications or via another wireless communication system.

3. The method of claim 2, wherein the other wireless communication system is a Wi-Fi system.

4. The method of claim 1, wherein the retreat space request message is sent from a personal portable device of the person.

5. The method of claim 4, wherein the portable device is a smartphone, a tablet computer, or laptop computer or notebook computer.

6. The method of claim 1, wherein the retreat space request message comprises information about an ambience to be set.

7. The method of claim 1, wherein the backend server sends a reservation message to the vehicle, which reservation message comprises information about the reserved time, a location where the vehicle is to be available, and which ambience is to be set in the vehicle interior.

8. The method of claim 7, wherein the vehicle is driven autonomously to the location indicated.

9. A vehicle, wherein the vehicle is equipped with an on-board connectivity unit OCU, configured to:
receive a retreat space request message from a person or a reservation message from a backend server of a service provider for creating an ambience, wherein the retreat space request message comprises at least a location for the vehicle, the time at which the vehicle is to be provided, and the duration for which the vehicle is to be provided, and to
send a confirmation message, comprising at least authentication information to gain access to the vehicle; wherein the vehicle comprises one or more of:
a lighting unit, using which the interior is lit correspondingly in accordance with the requested ambience,
an electronic entertainment unit, using which corresponding images, videos and/or music can be played back in accordance with the requested ambience, and
an air-conditioning unit, using which the vehicle interior is air-conditioned correspondingly in accordance with the requested ambience; wherein
a vehicle interior of the vehicle is configured according to the retreat space request message, which configuration comprises one or more of the lighting unit, the air-conditioning unit, and the electronic entertainment unit in the vehicle interior at a reserved time in accordance with the retreat space request message.

10. The vehicle of claim 9, wherein the air-conditioning unit is equipped with a scent generator, by means of which a corresponding scent is generated in the vehicle interior in accordance with a requested ambience.

11. The vehicle of claim 9, wherein the electronic entertainment unit is equipped with a number of display devices on which the images and/or videos are played back in the vehicle interior in accordance with a requested ambience.

12. The vehicle of claim 9, wherein the vehicle is equipped with an interface for the delivery of items, by means of which interface a delivery service can access the vehicle.

13. The vehicle of claim 12, wherein the interface comprises of a lockable door, flap or window that can be unlocked by means of an authentication feature disclosed to the delivery service.

14. The vehicle of claim 13, wherein the interface comprises a receptacle for keeping warm or for cooling of meals and/or drinks.

15. The method of claim 7, wherein the vehicle is driven autonomously to the location indicated.

16. The vehicle of claim 10, wherein the electronic entertainment unit is equipped with a number of display devices on which the images and/or videos are played back in the vehicle interior in accordance with the requested ambience.

17. The vehicle of claim 10, wherein the vehicle is equipped with an interface for the delivery of items, by means of which interface a delivery service can access the vehicle.

18. The method of claim 1, comprising determining one or more of heart rate, eye movements, and skin resistance of the person while the person is recuperating in the vehicle.

19. The method of claim 18, comprising determining a level of relaxation of the person from one or more of the determined heart rate, eye movements, and skin resistance.

* * * * *